United States Patent
Baard et al.

(10) Patent No.: US 11,771,028 B2
(45) Date of Patent: Oct. 3, 2023

(54) USE OF GREEN MICROALGAE TO IMPROVE PLANT GROWTH

(71) Applicants: Algae Innovations Netherlands B.V., Amsterdam (NL); Universiteit van Amsterdam, Amsterdam (NL)

(72) Inventors: Robert Baard, Amsterdam (NL); Wishwas Abhyankar, Amsterdam (NL); Stanley Brul, Amsterdam (NL)

(73) Assignees: ALGAE INNOVATIONS NETHERLANDS B.V., Amsterdam (NL); UNIVERSITEIT VAN AMSTERDAM, Amsterdam (NL)

( * ) Notice: Subject to any disclaimer, the term of this patent is extended or adjusted under 35 U.S.C. 154(b) by 262 days.

(21) Appl. No.: 17/253,816

(22) PCT Filed: Jun. 21, 2019

(86) PCT No.: PCT/EP2019/066498
§ 371 (c)(1),
(2) Date: Dec. 18, 2020

(87) PCT Pub. No.: WO2019/243587
PCT Pub. Date: Dec. 26, 2019

(65) Prior Publication Data
US 2021/0171413 A1    Jun. 10, 2021

(30) Foreign Application Priority Data

Jun. 21, 2018 (EP) .................................... 18179068

(51) Int. Cl.
*A01G 33/00* (2006.01)
*C05G 5/23* (2020.01)
(Continued)

(52) U.S. Cl.
CPC .............. *A01G 33/00* (2013.01); *C05F 11/00* (2013.01); *C05G 5/23* (2020.02); *C05G 5/27* (2020.02); *C05G 3/00* (2013.01)

(58) Field of Classification Search
None
See application file for complete search history.

(56) References Cited

U.S. PATENT DOCUMENTS 8,173,391 B2   5/2012  Nagnath
9,365,461 B2 * 6/2016  Fiato ........................ C05F 11/08
(Continued)

FOREIGN PATENT DOCUMENTS

EP   3055415 A1    8/2016
FR   3023548 A1 *  1/2016  ................ C02F 3/32
(Continued)

OTHER PUBLICATIONS

Coppens et al., "The use of microalgae as a high-value organic slow-release fertilizer results in tomatoes with increased carotenoid and sugar levels", J Appl Phycol, pp. 1-11, (Aug. 2015).

*Primary Examiner* — Wayne A Langel
(74) *Attorney, Agent, or Firm* — BROWDY AND NEIMARK, PLLC

(57) ABSTRACT

The present invention relates to a liquid composition comprising living green microalgae for improving plant growth. The liquid composition is prepared by growing green microalgae at a pH of 10-12 in the presence of hydrogen carbonate as the inorganic carbon source. The liquid composition may be stored at 4 to 25 degrees C. until use. The liquid composition may be used to improve fertilizers.

17 Claims, 2 Drawing Sheets

(51) Int. Cl.
    *C05F 11/00*     (2006.01)
    *C05G 5/27*     (2020.01)
    *C05G 3/00*     (2020.01)

(56) References Cited

U.S. PATENT DOCUMENTS

| | | | |
|---|---|---|---|
| 9,854,810 B2 | 1/2018 | Meeder | |
| 2010/0210002 A1* | 8/2010 | McCaffrey | A01G 33/00 |
| | | | 435/257.1 |
| 2010/0240114 A1* | 9/2010 | Palmer | A01G 33/00 |
| | | | 435/244 |
| 2011/0124089 A1 | 5/2011 | Stepenoff et al. | |
| 2013/0269244 A1* | 10/2013 | Jovine | A01G 33/00 |
| | | | 47/1.4 |
| 2014/0099692 A1* | 4/2014 | Blanchet | C12P 5/023 |
| | | | 435/167 |
| 2014/0345341 A1 | 11/2014 | Fiato et al. | |
| 2017/0028347 A1 | 2/2017 | Wright et al. | |
| 2017/0127656 A1* | 5/2017 | Bee | C12M 1/002 |

FOREIGN PATENT DOCUMENTS

| | | | | |
|---|---|---|---|---|
| FR | 3023584 | * | 1/2016 | A01G 33/00 |
| JP | 5-284962 A | | 11/1993 | |
| WO | WO 2009/094440 A1 * | | 7/2009 | A01K 63/06 |
| WO | 2016175302 A1 | | 11/2016 | |
| WO | 2017/031160 A1 | | 2/2017 | |
| WO | WO 2018/011275 A1 * | | 1/2018 | C12P 7/64 |

\* cited by examiner

US 11,771,028 B2

USE OF GREEN MICROALGAE TO IMPROVE PLANT GROWTH

FIELD OF THE INVENTION

The present invention relates to a liquid composition based on microalgae for improving plant growth. It also relates to a method for preparing it and to the use of the liquid composition.

BACKGROUND OF THE INVENTION

Over the years, the ample use of fertilizers has caused problems to the environment. These fertilizers contain mainly dissolved minerals, nutrients for the plant. Soil-plant interactions are not stimulated by these products. This benefits the plants, temporarily, but the soil becomes exhausted over time and polluted and soil fertility is lost. Currently worldwide there is a demand for an economic and environmentally friendly option for farmers and plant growers. Plant growth enhancers of natural origin, also referred to as biofertilizers, have been considered a preferred alternative to existing fertilizers, because they increase the nutrition efficiency and general health of plants.

Macroalgae, commonly known as seaweed, have frequently been suggested as fertilizers. EP 3 055 415 describes a fertilizer composition comprising an extract or a lysate from algae preferably from seaweeds, such as *Ascophyllum nodosum*, comprising exogenous small RNA molecules. U.S. Pat. No. 9,854,810 discloses a fertilizer obtained by treating seaweeds with acetic acid as acidifying agent and KOH as alkalizing agent. It is mixed with American leonardite to obtain a dry product. Although worldwide seaweed is used as a plant growth improver, the disadvantage of the use of seaweed is that it is from waters of which the quality and conditions are often unknown and are not controlled. Seaweed sources also have high salinity, which is another disadvantage for plants.

Microalgae are microscopic small plants typically found in freshwater and marine systems. They are often unicellular species which exist individually, or in chains or groups. The use of dried microalgae as a fertilizer has been described, see for example Coppens et al, 2016 J. Applied Phycol. 28:2367. This document describes the use of pasteurized and dried microalgae as slow-release fertilizer. The microalgae are grown in a photobioreactor. US 2014/0345341 describes the production of biofertilizer from cyanobacteria in a photobioreactor. Photobioreactors are rather expensive in construction and use. It would be desirable to have an alternative which may be produced more economically and more practically and which may be used for commercial production.

DETAILED DESCRIPTION OF THE INVENTION

Figure 1:
FIG. 1 Root development of 5 weeks old *Arabidopsis* plants. Left: control grown on complete substrate; Right: grown on complete substrate mixed with a liquid composition according to the invention.

The present invention relates to a method for preparing a liquid composition comprising living green microalgae, wherein the method comprises:
  culturing green microalgae in an open pond in an aqueous medium at pH 10 to pH 12, the medium comprising less than 5 mM sodium and hydrogen carbonate as the inorganic carbon source;
  harvesting the green microalgae by sedimentation or centrifugation to obtain a liquid composition comprising living green microalgae, the liquid composition having a dry matter content in the range of 0.5% w/w to 10% w/w and a sodium content of less than 5 mM.

The method according to the invention has several advantages. One advantage is that the liquid composition obtained by the method according to the invention is more effective in promoting plant growth than inorganic fertilizers. The method according to the invention yields a liquid composition which may be used to initiate and enhance the activity of beneficial soil microorganisms thereby fostering improvements of plant growth conditions.

Another advantage is that the method allows for cultivation in a pond. As a consequence, culture conditions are more controlled than with seaweeds obtained from sea.

Another advantage is that the method allows for cultivation in fresh water. Therefore, the products obtained will have a lower sodium chloride content and lower iodide content than seaweed-based products.

Another advantage is that the liquid composition obtained by the method is of higher nutritional value for a plant than a seaweed-based composition. Microalgae products contain important plant stimulating components like proteins along with all the essential amino-acids, main and significant trace elements, pigments (antioxidants), vitamins, carbohydrates, plant growth regulators (hormones) and important polyunsaturated fatty acids.

Another advantage is that the method allows for culturing in land-based ponds, which avoids high transportation costs from sea to land.

Yet another advantage is that the methods allows for culturing in an open system. In general, open culture systems, such as open ponds, have lower construction costs than closed systems, such as photobioreactors. Investment and operational costs of closed systems are 10-20% higher compared to open systems. Worldwide open systems prove to be the only systems that are successfully commercially operated at large scale dimension.

The method according to the invention comprises culturing green microalgae. In the context of the present invention, culturing refers to an increase in green microalgal biomass due to an increase in size or an increase in number. The green microalgae are eukaryotic, photosynthetic, unicellular, organisms of the order Chiorococcales, belonging to the class Chlorophyceae, in particular to the division Chlorophyta, and are preferably fresh water microalgae. In one embodiment, the green microalgae belong to a family selected from Chlorellaceae, Dunaliellacea, Eustigmataceae, Haematococcaceae, Hydrodictyaceae, Selenastraceae, Scenedesmaceae and Volvocaceae, such as a genus selected from the group *Ankistrodesmus, Chlorella, Dunaliella, Haematococcus, Pediastrum, Scenedesmus* and *Volvox*. Preferably, the microalgae are fresh water green microalgae selected from the group *Ankistrodesmus, Chiorella, Haematococcus, Pediastrum, Scenedesmus* and *Volvox*, such as *Ankistrodesmus falcatus, Chiorella vulgaris, Pediastrum boryanum, Scenedesmus dimorphus* or *Scenedesmus quadricauda*. Most preferably, the green microalgae belong to the Hydrodictyaceae or the Scenedesmaceae, such as *Pediastrum* or *Scenedesmus*, in particular, *Pediastrum boryanum, Scenedesmus dimorphus* or *Scenedesmus quadricauda*.

Cultivation according to the method according to the invention takes place in open systems, such as open ponds. In the context of the present invention, the term open, such as in open pond, refers to a culture system in which the culture is exposed to the open air. The open system may be completely or partly covered, as long as it allows for gas exchange between the surface of the culture and the atmosphere. In one embodiment, at least 80%, at least 90% and preferably 100% of the surface of the culture is in contact with the atmosphere and can exchange gases with the atmosphere. In one embodiment, the open system also allows for the infiltration of rain water in the culture, typically through its water surface.

The pond may be natural or artificial. In one embodiment, the pond is situated in the earth's surface, such as in a land-fill site. In another embodiment, the pond is situated in a container, a tub, tank, pool or a basin, which may be from concrete, wood, plastic or which may be tiled. The pond is typically situated outdoors, for example in an outdoor tank. It may be completely or partly covered, for example in a construction with a roof and no walls. The pond may have any form, such as circular, oblong, rectangular or irregular. In one embodiment, the pond is of the oblong type raceway type, constructed in the form of a single unit with a central dividing wall. The pond may have any size, such as in the range from 1000 liter to 800,000 liter. In one embodiment, a pond with a capacity in the range from 100,000 to 500,000 liter or 200,000 to 600,000 liter is used. The open pond is preferably shallow, for example with a depth of not more than 50 cm. In one embodiment, the depth of the pond is in the range of 30-50 cm or 40-50 cm. In one embodiment, the pond is lined with water tight material. The material used for lining the pond is preferably made from flexible, non-toxic, UV-resistant material which is easy to seal, for example flexible, non-toxic, UV-resistant plastics, such as polyvinylchloride or polypropylene. The lining preferably does not easily release plasticizers. In one embodiment, the lining meets drinking water quality. One or more ponds may be situated close to each other or next to each other. In one embodiment, the open pond is of the raceway design type situated in a greenhouse construction with open air exposure and which allows for the infiltration of rain water in the culture.

The open pond used in the method according to the invention may have one or more inlets for culture medium, recirculated culture medium, hydrogen carbonate, spring water, tap water, minerals or nutrients; and one or more outlets, such as for harvesting.

The open pond comprises a culture medium which must be suitable for the culturing of microalgae. The culture medium is preferably aqueous, typically water comprising all the essential elements for microalgal growth. The water for the aqueous medium is supplied to the pond from a water source. The water source may be a container comprising water. The water is preferably fresh, since the final microalgal product is applied to plants and most plants do not grow well under salty conditions. The water may be tap water, rain water or spring water. The spring water may be obtained from underground water sources. Waste water, including industrial waste water, may also be used. Any water may be used, as long as it does not contain substances which disturb microalgal growth or substances which are harmful for humans, such as polycyclic aromatic compounds (PACs), in particular polycyclic aromatic hydrocarbons (PAHs). If the end product will be applied to highly or moderately salt tolerant plants, brackish water may be used. Salt water is preferably not used.

In one embodiment, at the start of culturing at least 50% v/v, at least 60% v/v, at least 70% v/v, at least 80% v/v or at least 90% v/v of the medium, for example 50-100% v/v or 80-100% v/v of the medium is spring water or tap water. In another embodiment, at the start of culturing the pond is filled with a mixture of tap water and spring water. The ratio, tap water: spring water may for example be 1:1, 1:2, 1:5, 1:9, 2:1, 5:1 or 9:1. In another embodiment, at the start of culturing the pond comprises mainly tap water, while spring water is regularly added to the medium. In yet another embodiment, at the start of culturing the pond comprises mainly spring water, for example at least 80-100% v/v of the medium is spring water. Spring water has the advantage that it comprises several essential minerals and hydrogen carbonate which are required for the growth of the microalgae. The water may be supplied in any form. In one embodiment, the water is supplied in liquid form. In yet another embodiment, the water is supplied in vapor form which becomes liquid after condensation, for example after condensation against the wall of the container forming the pond.

Microalgae require an inorganic carbon source and light energy for photosynthesis and growth. In the method according to the invention, light energy may be obtained from the sun or from artificial lighting. Preferably, sun light is used, optionally in combination with artificial lighting. In particular at night and in bad weather conditions, a combination with artificial lighting may be desired. A suitable example of artificial lighting is LED light. If artificial lighting is applied, preferred wavelengths are around 450 nm, around 647 nm and around 663 nm. The skilled person will understand that the application of artificial lighting will make the system less economic. In one embodiment, sun light is not combined with artificial lighting and it is accepted that oxygen production by photosynthesis will be lower at low light conditions and during the night. The algae are thus subjected to an alternating light-dark regime. During the dark period microalgal cells will start to regenerate cell components.

The inorganic carbon requirement cannot be met by simple diffusion of carbon dioxide from the air, since the natural concentration in air (0.03%) is too low to sustain optimal growth and high productivity of the microalgae. According to the method of the invention, the additionally required inorganic carbon is supplied in the form of hydrogen carbonate, also referred to as bicarbonate or $HCO_3^-$. Carbon dioxide is preferably not used as a supplemental inorganic carbon source. The hydrogen carbonate may be supplied in any form, preferably it is supplied as the dissolved bicarbonate ion, which may be obtained from bicarbonate salts such as ammonium bicarbonate or potassium bicarbonate. Sodium bicarbonate is rather avoided, since the sodium may accumulate in the end product, which may then become less suitable for promoting plant growth because of its salinity. The hydrogen carbonate may be obtained from any source. In one embodiment, spring water is used as the hydrogen carbonate source. Hydrogen carbonate must be present in excess, typically at least 50 mg/l. Usually, more than 600 mg/l hydrogen carbonate is not required. In any way, it should not be limiting the growth. Therefore, suitable ranges are from 50 mg/l to 600 mg/l, from 50 mg/l to 400 mg/l, from 100 mg/l to 400 mg/l or from 100 mg/l to 600 mg/I. Due to the use of hydrogen carbonate, the pH of the culture remains at a value in the range from pH 10 to pH 12 during photosynthesis. The skilled person will understand that at pH 10-12, there will be an equilibrium between hydrogen carbonate ($HCO_3^-$) and carbonate ($CO_3^{2-}$), which has no adverse effect on the culture, as long as the pH is kept in the range of pH 10-pH 12, which is done by adding hydrogen carbonate when required.

In addition to water and inorganic carbon, the culture medium used in the method according to the invention comprises several elements which are required for structural synthesis of microalgal biomass, including magnesium (Mg), nitrogen, (N), phosphorus (P), potassium (K) and sulphur (S). These main elements are typically present in an amount in the range from 2 mg/l to 200 mg/l, such as from 2 mg/l to 100 mg/l, from 2 mg/l to 50 mg/l or from 2 mg/l to 10 mg/I. In the method according to the invention, nitrogen is present in the form of nitrate or ammonia, preferably at an amount which is equal to approximately 10% of the dry weight; phosphorus is present in the form of phosphate, for example as monopotassium phosphate or tripostassium phosphate; sulphur is present in the form of sulphate, for example magnesium sulphate, or sulphite. Various other elements, like boron, copper, iron, manganese, molybdenum and zinc, are essential trace elements. Preferably, iron is present in the culture medium in the form of ferrous iron. These elements are required in very small amounts of micrograms per liter, typically between 10 microgram/l and 2000 microgram/l, such as between 10 microgram/l and 1000 microgram/l, between 10 microgram/l and 500 microgram/l or between 10 microgram/l and 100 microgram/I.

Any algal culture medium may be used for culturing the green microalgae, as long as the culture medium comprises sufficient of the main elements and trace elements. Typically, more than 2 μmol/l of most main elements and more than 0.1 micromol/l of the trace elements are required to be non-limiting. Non-limiting amounts are $NH^{4+}$>3.6 μmol/l, $K^+$>1.3 μmol/l, $Ca^{2+}$>1.2 μmol/l, $Mg^{2+}$>2.0 μmol/l, $NO^{3-}$>3.5 μmol/l, $NO_2$=0, $Cl$<1.5 μmol/l, $SO^{4-}$>0.5 μmol/l, $HCO^{3-}$>0.8 μmol/l, $H_2PO_4^-$>1.6 μmol/l, $Si^{2+}$>0.2 μmol/l, $Fe^{3+}$>0.8 μmol/l, $Mn^{2+}$>0.2 μmol/l, $Zn^{2+}$>0.2 μmol/l, $B^{3+}$>0.2 μmol/l, $Cu^{2+}$>0.2 μmol/l, $Mo^{4+}$>0.1 μmol/l.

In one embodiment, the culture medium comprises from 2 mg/l to 200 mg/l of the main elements, such as magnesium, nitrate and phosphate, from 500 mg/l to 600 mg/I hydrogen carbonate as a carbon source, from 10 μg/l to 2 mg/l of the trace elements like iron, zinc, manganese and copper and less than 115 mg/l sodium.

Sodium is not required for culturing fresh water green microalgae and therefore non-limiting concentrations for $Na^+$ are <6.5 μmol/l. In view of the final application of the liquid product of the process, promoting plant growth, sodium concentrations should be kept as low as possible. Sodium concentration in the medium should be lower than 5 mM, such as from 0 mg/l to 110 mg/l, 0.5 mg/l to 90 mg/l or from 20 mg/l to 50 mg/l, preferably lower than 2 mM, such as from 0.5 mg/l to 40 mg/l, from 5 mg/l to 30 mg/l or from 15 mg/l to 25 mg/l, most preferably lower than 1 mM, such from 0 mg/l to 20 mg/l or from 0.5 mg/l to 10 mg/l, to allow application of the final liquid microalgal product to many types of different plants, including salt intolerant plants.

Main and trace elements may be added to the water or may be naturally present. In one embodiment, the use of spring water provides for most or all of the essential elements. Essential elements may be added to the culture. In one embodiment, nitrogen, phosphorus and magnesium are periodically added until the above concentrations have been reached. In one embodiment, they are added in inorganic form, such as in the form of magnesium nitrate, ammonium nitrate or phosphate. Mineral concentrations are controlled, light and temperature may vary.

Culturing may be in a batch system or in a continuous or semi-continuous culture system. Preferably, culturing is in a continuous culture system which allows for continuous harvesting. Whichever system is used, the additional carbon necessary for photosynthesis is supplied in the form of hydrogen carbonate and not in the form of carbon dioxide. As a result, during photosynthesis the pH will remain in the range of pH 10 to pH 12, a pH range to which it typically increases as a result of microalgal photosynthesis. When the desired concentration of the culture is obtained, for example about 200-400 mg/l, the microalgae are harvested while keeping them alive.

To start the culture, the pond may be inoculated with a pre-culture, preferably a monoculture of microalgae grown in a sterile system at smaller scale. The pre-culture may have been grown in a batch system or in a continuous or semi-continuous culture system. A suitable inoculum is 30-60 liter/400 cubic meter, wherein the inoculum has a cell density of 300-500 mg/l, calculated as dry matter content. In one embodiment, the pond is inoculated several times during the first week, for example at least twice, at least three times, such as four, five, six or seven times until green colouring of the water by microalgae is visual, typically 5-7 days. The density of the culture is continuously measured during this initial phase. After this initial phase, culturing may be continued without further pre-culture inoculations.

The density of the culture may be determined by any suitable method, such as by measuring optical density, preferably at 663 nm, or by cell counting. In one embodiment, the density of the culture is based on dry matter content. Dry matter content may be determined by any suitable method. In a preferred embodiment, dry matter content is determined by a qualified and certified lab scale method which comprises filtering a known volume of the microalgae over a Whatmann GFF filter (pore size 1.2 μm) and drying the filter for 24 hours at 80 degrees C., for example in an oven. From the difference between the filter weight and the weight after drying, the dry matter content of the microalgae may be calculated.

In a preferred embodiment, the microalgae are cultured according the continuous culture principle, which allows the microalgae culture to be maintained in a physiologically steady state. In this steady state, growth occurs at a constant specific growth rate and the dilution rate is equal to the reproduction time of the microalgae. In practice this means that the dilution rate of the culture is achieved by continuously harvesting the microalgae. The reproduction time of the microalgal biomass depends on the weather conditions (mainly on irradiance) and varies from 2-10 days. Reproduction time may be determined by any suitable method, for example by measuring increase in optical density (OD) at 663 nm or by determining dry matter content. The skilled person will understand that microalgal growth will vary with the seasons, with the light and with the temperature, being more abundant at higher temperatures and in more light. In the Netherlands, highest productivity is usually in the period from June to August.

During culturing in the open pond, the temperature of the culture is similar to the outside temperature, which may be a temperature in the range from −1 degrees C. to 35 degrees C. The temperature in the culture medium is constantly monitored.

In one embodiment, the pond comprises water moving devices for stirring or agitation, to keep the microalgal cells in suspension and periodically expose them to light in order to ensure photoautotrophic growth and to avoid deposited solids. Suitable water moving devices are paddle wheels and pivoted agitators, depending on the form of the pond. These water moving devices are preferably primarily made from inert material, such as plastic, for example high density polyethylene (HDPE) material, or stainless steel. Agitation also contributes to uniform distribution of minerals in the medium, which prevents the occurrence of nutritional and gaseous gradients around the microalgal cells formed during active metabolism. The moving devices for stirring or agitation are switched on before inoculation, while the pond is filled with a low level of water, for example 5 to 20 cm of water. The moving devices for stirring or agitation are of great importance for stirring the culture and to keep the microalgal cells in suspension and periodically expose them to light in order to ensure photoautotrophic growth and to avoid deposited solids.

The culture is mixed to minimize settling of the microalgae. The mixing velocity of the culture necessary for optimal microalgal growth varies and depends primarily on the settling rate of the specific microalgal cells. In general, a mixing velocity of the culture in the range of 5 to 20 cm/sec will be sufficient to avoid deposition of cells. In one embodiment, a mixing velocity of the culture of 10 to 18 cm/sec is used.

In one embodiment, the pond comprises one or more guiding baffles for guiding the culture in or through the bends of the pond.

For monitoring and controlling essential process conditions such as pH, oxygen concentration, electric conductivity, temperature, cells density and light conditions, an automated programmable process control system may be used. In one embodiment, process control is in the form of online remote control.

In the context of the present invention, harvesting refers to recovery of the microalgal biomass, in particular by separating the microalgal biomass from the culture medium. The green microalgae are harvested by a gentle method which separates culture medium and biomass and keeps the microalgae alive. Damage to their cell walls must be minimized. Damaged cell walls may be apparent from cell components, such as chlorophyll, in the culture medium. Therefore, harvesting the microalgal biomass by a method which includes heating, freezing, sterilization, mechanical disruption, pulverization, extraction or drying is not part of the method according to the present invention. Harvesting by sedimentation or centrifugation is preferred because the green microalgae, or the major part of the green microalgae, such as at least 80%, at least 85%, at least 90% or at least 95% of the green microalgae in the harvested fraction, are kept alive. In one embodiment, the microalgae are harvested by centrifugation, preferably at a speed of not more than 4000 rpm. Alternatively, the green microalgae are harvested by sedimentation, preferably by autoflocculation. Autoflocculation may be achieved with or without addition of flocculation agents. In one embodiment, it is achieved by precipitation with iron, magnesium, calcium or phosphate in the medium. In another embodiment, autoflocculation is achieved by increasing the concentration of iron or magnesium in the medium, for example by adding high amounts of iron or magnesium to the culture. Autoflocculation by limiting $CO_2$ supply or by organic polymer secretion is preferably not used for harvesting. As a result of autoflocculation, the microalgal cells will settle at the bottom of the harvesting unit during harvesting. The culture medium is preferably recirculated to the culture in the pond. The biomass collected from the bottom of the tank is highly concentrated compared to the dilute culture in the pond. In one embodiment, microalgal biomass is harvested by pumping the culture to the top of a harvesting unit in which the microalgae are allowed to settle without the addition of flocculation agents. The culture medium is recirculated to the culture in the pond. The concentrated microalgal biomass is collected from the bottom.

After harvesting, a liquid composition is obtained. This liquid composition, comprising living green microalgae, is another aspect of the present invention. The liquid composition according to the invention may be used as such or be mixed with a fertilizer to promote plant growth. The dry matter content of this liquid composition is preferably in the range of 0.5% w/w to 10% w/w dry matter. With a dry matter content in this range, the liquid composition is pumpable. The liquid composition may have a dry matter content of 1.0% w/w to 10% w/w, such as from 2.0% w/w to 4.0% w/w, 1.5% w/w to 8.0% w/w, 1.0% w/w to 4.0% w/w or 3.0% w/w to 5% w/w. In one embodiment, the liquid composition has the consistency of water. In another embodiment, the liquid composition is a slurry with the consistency of sour milk. The liquid composition comprises living green microalgae and should not be dried or frozen. Preferably, the liquid composition comprises maximally 5 mM $Na^+$, more preferably maximally 2 mM $Na^+$, most preferably, maximally 1 mM $Na^+$.

The liquid composition may be used immediately, or almost immediately, after preparation, or it may be stored. The liquid composition is stored in liquid form. In one embodiment, the liquid composition is used within 24 hours or within 48 hours after harvesting. In another embodiment, the liquid composition is stored for at least 1 week, at least 3 weeks or at least 5 weeks before use. Preferably, the liquid composition is used within 1 year of harvesting.

The liquid composition may be stored at a temperature of 4-25 degrees C. In one embodiment, the liquid composition is stored at low temperature, for example at 4 degrees C., for several hours, several days, several weeks or several months before use. In another embodiment, the liquid composition is stored at a temperature in the range of 12 to 25 degrees C. for several hours, several days, several weeks or several months before use.

The liquid composition may be stored anaerobically or virtually anaerobically. In one embodiment, the liquid composition is stored in a vessel, filled to the rim, closed with an airtight lid. The liquid may be stored in the light or the dark, whichever is convenient.

The liquid composition may be diluted before use. Diluting is preferably with water low in sodium, such as spring water, and not with tap water, since most tap water is high in sodium, which may damage plants treated with the composition. Preferably, after dilution, the liquid composition comprises maximally 5 mM $Na^+$, more preferably maximally 2 mM $Na^+$, most preferably, maximally 1 mM $Na^+$.

The liquid composition may advantageously be used to promote plant growth. The composition encourages the development of beneficial microorganisms. In one embodiment, the composition enhances the activity of microorganisms involved in nutrient fixation, thereby increasing the availability of nitrogen to plants. The liquid composition may be used as such or it may be used as an ingredient for another product, in particular for a fertilizer product. It may be mixed with a fertilizer product. The fertilizer product may be included in or added to a substrate before or after being mixed with the liquid composition according to the invention.

The liquid composition as harvested comprises living green microalgae. The liquid composition comprises at least 75% green microalgae, such as between 70% and 100%, between 75% and 95% or between 80% and 95%, which is an estimate based on the total number of algal cells in a sample, microscopically determined. The liquid composition preferably comprises one species of green alga, but may also comprise a mixture of different green microalgae.

Preferably at least 80%, at least 85%, at least 90% or at least 95% by weight of the microalgal biomass is alive. One way to determine whether the green microalgae are alive is to expose all or part of the microalgae to natural or artificial light. Living green microalgae will produce oxygen by photosynthesis. Production of oxygen may easily be determined by the use of an oxygen probe. Another way to determine whether the green microalgae are alive is by visual inspection. Dead or leaking microalgae will release all or part of their cell content. In particular extracellular chlorophyll may easily be detected visually because of its green colour. Other ways for determining whether the microalgae are alive is through the analysis of chlorophyll or protein in the supernatant after centrifugation, assessment of colony forming units on agar plates or by staining with a fluorescent dye, such as fluorescein diacetate, followed by flow cytometric analysis. Quantitation may be done in several ways, for example microscopically, using cell counting chambers.

The living green microalgae for promoting plant growth are freshwater green microalgae belonging to the class Chlorophyceoe, preferably belonging to a family selected from Chlorellaceae, Dunaliellacea, Eustigmataceae, Haematococcaceae, Hydrodictyaceae, Selenastraceae, Scenedesmaceae and Volvocaceae, such as a genus selected from the group *Ankistrodesmus, Chlorella, Dunaliella, Haematococcus, Pediastrum, Scenedesmus* and *Volvox*. More preferably, the microalgae are fresh water green microalgae selected from the group *Ankistrodesmus, Chlorella, Haematococcus, Pediastrum, Scenedesmus* and *Volvox*, such as *Ankistrodesmus falcatus, Chlorella vulgaris, Pediastrum boryanum, Scenedesmus dimorphus* or *Scenedesmus quadricauda*, most preferably selected from the group *Pediastrum* or *Scenedesmus*, such as, *Pediastrum boryanum* or *Scenedesmus dimorphus* or *Scenedesmus quadricauda*.

Use of the liquid composition comprising living microalgae results in a plant with improved growth, such as improved root development, improved nutrient assimilation, improved efficiency of plant metabolism or increased photosynthesis, in comparison to a plant which has not been grown on or in substrate comprising the liquid composition according to the invention. The liquid composition according to the invention allows for a new innovative method for the growth of healthy and green plants as well as for plant protection. An inorganic fertilizer, which is a composition which mainly comprises elements, such as nitrogen, phosphorus and potassium, may be improved by mixing it with the liquid composition according to the invention. An improved fertilizer thus obtained is another aspect of the invention.

The liquid composition according to the invention may be applied to the substrate of any type of plant in horticulture, hydroculture or agriculture. The substrate may be organic or inorganic, solid or liquid, and may consist of or include clay, coir dust, compost, fibers, grit, loam, moss, peat, perlite, sand or water. The liquid composition according to the invention may be applied to the plant through its substrate. By adding the liquid composition comprising the living green microalgae to the substrate in which the plant is growing, the availability of nutritional elements present in the substrate may be increased. Alternatively, the liquid composition according to the invention may be included in a nutrition medium, such as a liquid fertilizer, which is applied to substrate of the plant. The liquid composition according to the invention may also be applied directly to the plant or to plant parts, such as twigs, leaves or flowers, instead of to the substrate. The liquid composition may be applied to substrate, plant or plant parts in any convenient way, including pouring, soaking, injecting or spraying. Spraying may conveniently be performed using a nozzle or spray head system. The application frequency of the liquid composition according to the invention for treatment of the plant will depend on the plant and the objective of the treatment. In one embodiment, the application frequency is every day. In another embodiment, the application frequency is once a week, three times a week or every month. The application may be intermittent or continuous.

Any plant may benefit from the workings of the liquid composition according to the invention. In one embodiment, the plant is an ornamental plant, which includes flowering and non-flowering plants. In another embodiment, the plant is a consumable plant, which includes cereals, crops, fruit trees, herbs, medicinal plants and vegetables. In another embodiment, the plant is a member of the Alliaceae, Apiaceae, Asparagaceae, Asphodelaceae, Asteraceae, Araucariaceae, Begoniaceae, Brassicaceae, Bromeliaceae, Buxaceae, Chenopidiaceae, Cichorioideae, Chenopodiaceae, Coniferae, Cucurbitaceae, Fabaceae, Gentianaceae, Gramineae, Iridaceae, Leguminosae, Liliaceae, Malvaceae, Marantaceae, Marasmiaceae, Musaceae, Oleaceae, Orchidaceae, Paeoniaceae, Pleurotaceae, Pinaceae, Poaceae, Rosaceae, Rubiaceae, Rutaceae, Salicaceae, Solanaceae, Sterculiaceae, Taxaceae, Tuberacea, Vandeae, Vitacea or Xanthorrhoeaceae family, preferably of the Asteraceae, Begoniaceae, Brassicaceae, Chenopodiaceae, Cucurbitaceae, Gramineae, Leguminosae, Liliaceae, Malvaceae, Musaceae, Orchidaceae, Paeoniaceae, Rosaceae, Rubiaceae, Rutaceae, Salicaceae, Solanaceae, Sterculiaceae or Vandeae family, most preferably of the Begoniaceae, Brassicaceae, Orchidaceae, Paeoniaceae, Rosaceae or Solanaceae family.

The plant may be a species of the genus *Alchemilla, Allium, Aloe, Alstroemeria, Arabidopsis, Argyranthemum, Avena, Begonia, Brassica, Bromelia, Buxus, Calathea, Campanula, Capsicum, Cattleya, Cichorium, Citrus, Chamaecyparis, Chrysanthemum, Clematis, Cucumis, Cyclamen, Cydonia, Cymbidium, Cynodon, Dianthus, Dracaena, Eriobotrya, Euphorbia, Eustoma, Ficus, Fragaria, Fuchsia, Gaultheria, Gerbera, Glycine, Gypsophilia, Hedera, Helianthus, Hordeum, Hyacinthus, Hydrangea, Hippeastrum, Iris, Kalanchoe, Lactuca, Lathyrus, Lavendula, Lilium, Limonium, Malus, Mandevilla, Olea, Oryza, Osteospermum, Paeonia, Panicum, Pelargonium, Petunia, Phalaenopsis, Phaseolus, Pinus, Pisum, Platycodon, Prunus, Pyrus, Ranunculus, Rhododendron, Rosa, Rubus, Ruta, Secale, Skimmia, Solanum, Sorbus, Sorghum, Spathiphyllum, Trifolium, Triticum, Tulipa, Vanda, Vicia, Viola, Vitis, Zamiocul-* cas or *Zea*. Preferably, the plant is a species of *Arabidopsis, Begonia, Brassica, Fragaria, Paeonia, Phalaenopsis, Rosa, Solanum* or *Vanda*.

In particular, the liquid composition may be used to promote the growth of commercially important crops and plants, such as alfalfa, apples, *Arabidopsis*, bananas, begonias, bromelias, cereals, cherries, citrus fruits, grapes, maize, melons, olives, onions, orchids, peaches, peonies, potatoes, rice, soybeans, sugar beets, spinach, strawberries, tomatoes or wheat, more in particular of *Arabidopsis*, begonias, orchids, peonies, strawberries and tomatoes.

The liquid composition according to the invention may also be used for improving the growth or development of seeds, tubers or bulbs. The liquid composition may be used as such or may be mixed with substrate or nutrition medium. It may be applied to the seeds, tubers or bulbs in any convenient way, including pouring, soaking and spraying. In one embodiment, the liquid composition according to the invention is used to coat seeds, tubers or bulbs.

The effect of the application of the liquid composition according to the invention is improved growth, such as improved root development, improved nutrient assimilation, improved efficiency of plant metabolism or increased photosynthesis. This may be apparent from improved yield, improved leaf formation, improved colour formation, improved flowering, improved fruit formation, improved taste or improved health compared to a similar plant to which the liquid composition according to the invention has not been applied.

Improvements may be determined in any suitable way generally used by the person skilled in the art, for example by counting, weighing or measuring. Improvement in any one of these areas may be at least 5%, at least 10%, at least 15%, at least 20%, at least 30%, at least 40%, at least 50%, at least 60%, at least 70%, at least 80%, at least 90%, at least 100% at least 200%, or at least 300%, such as about 5% to 50%, about 5% to 100%, about 10% to 100%, about 20% to 50%, about 20% to 100% or about 100% to 200%.

Improved root development may be reflected in several ways, such as by more roots per plant, more roots per square area, accelerated root formation, earlier root formation, stronger roots, thicker roots, better functioning roots, more branched roots or a more wide spread root network.

Improved yield may be reflected in several ways, such as by more plants per area, more branches per plant, more buds per plant, more bulbs per plant, more fruits per plant, more flowers per plant, more leaves per plant, more seedlings from seed, more seeds per plant, more shoots per plant, more spores per plant, more starch per plant, more tubers per plant, more weight per plant, higher dry matter content, more primary metabolites per plant or more secondary metabolites per plant.

Improved growth may be reflected in several ways, such as by earlier germination, accelerated germination, accelerated stem growth, a thicker stem, earlier fruit formation, accelerated fruit formation, earlier ripening of fruit or accelerated ripening of fruit.

Improved leaf formation may be reflected in several ways, such as by more leaves per plant, more leaves per cm of stem, more buds per stem, larger leaves, broader leaves, thicker leaves, stronger leaves, better functioning leaves or earlier or accelerated leaf formation.

Improved colour formation may be reflected in several ways, such as by earlier colour formation, accelerated colour formation, more diverse colour formation, deeper colour formation, more intense colour or more stability of colour.

Improved flowering may be reflected in several ways, such as by earlier flowering, accelerated flowering, larger flowers, more flowers, more open flowers, longer lasting flowers, longer open flowers, by flowers which are more diverse in colour, by flowers having a desired colour or by flowers with more stability of colour.

Improved fruit formation may be reflected in several ways, such as by earlier fruit formation, accelerated fruit formation, longer period of bearing fruit, earlier ripening of fruit, accelerated ripening of fruit, more fruit, heavier fruit, larger fruit or tastier fruit.

Improved taste may be reflected in several ways, such as by less acidity, more sweetness, more flavour, more complex flavour profile, higher nutrient content or more juiciness.

Improved health may be reflected in several ways, such as by being more resistant to abiotic stress, being more resistant to biotic stress, being more resistant to chemical stress, being more resistant to physical stress, being more resistant to physiological stress, being more resistant to insect pests, being more resistant to fungal pests, growing more abundantly, flowering more abundantly, keeping leaves for a longer period or being more efficient in food uptake. In the present context, biotic stress factors comprise fungi and insects. Abiotic stress is the result of salinity, temperature, water or light conditions which are extreme to the plant under the given circumstances.

In one embodiment, the use of the liquid composition according to the invention leads to harvesting more plants or plant parts per area, such as more barks, berries, branches, buds, bulbs, cut branches, cut flowers, flowers, fruits, leaves, roots, seeds, shoots, spores or tubers per plant per area. The use of the liquid composition according to the invention may lead to an increase in the yield of crops. The harvest may be more abundant and harvesting may take place after a shorter period of time, in comparison with a situation in which the liquid composition according to the invention is not applied.

In one embodiment, application of the liquid composition according to the invention leads to more kilos of flowers, fruits, grains or vegetables, such as apples, aubergines, bananas, barley, bell peppers, blackberries, blue berries, cherries, chives, courgettes, cucumber, endive, garlic, grapes, leek, lettuce, maize, melons, oats, onions, oranges, pears, peppers, potatoes, pumpkins, radish, raspberries, rice, rye, strawberries, sweet peppers, tomatoes or wheat.

In another embodiment, the application of the method according to the invention leads to more kilos of barks, berries, branches, buds, flowers, fruits, leaves, roots or seeds from culinary or medicinal herbs, such as basil, chamomile, catnip, chives, coriander, dill, eucalyptus, fennel, jasmine, lavas, lavender, mint, oregano, parsley, rosemary, sage, thyme and thus to more aroma, flavour, fragrance, oil or taste in the same period of time or in a shorter period of time, in comparison to a situation in which the liquid composition according to the invention has not been applied.

In another embodiment, the use of the liquid composition according to the invention leads to a higher yield of antioxidants, colourants, nutrients, polysaccharides, pigments or terpenes. In one embodiment, the sugar content of the cells is increased.

The period of comparison with a control plant or control situation may be any period, from several hours, several days or several weeks to several months or several years. The area of comparison may be any area, such as square meters or hectares or per pot.

The liquid composition may be formulated before use, for example it may be used as a fertilizer ingredient with other CE (Conformité Européenne) marking components in accordance with the EU legislation status (product function category 1AII, 1 BII, 3A, 4,5,6 B) fertilizer. It may be mixed in a ratio of 1% to 99%, such as 4% to 80% or 5% to 25% by weight with other components, such as garlic or herbs. Therefore, in another aspect, the present invention relates to an improved fertilizer and to a method for preparing the improved fertilizer. The method for preparing the improved fertilizer comprises mixing a fertilizer with a liquid composition according to the invention. The liquid composition according to the invention may be mixed with or added to any kind of fertilizer, including slow-release fertilizers and controlled-release fertilizers, which may be in any form, such as granular, powder or liquid form.

The skilled person will understand that the above-mentioned embodiments may be combined to form new embodiments within the scope of the invention. Embodiments and preferred embodiments mentioned for the method of preparing the liquid composition may also be applied to the liquid composition and to its use in promoting plant growth, and vice versa.

EXAMPLES

Example 1 Cultivation of Green Microalgae

An open pond, raceway design (length 100 m, width 10 m, height 0.5 m), situated in a greenhouse with open air access, was filled with about 100.000 liter culture medium composed of tap water (90% v/v) and spring water (10% v/v). Due to the mixing with spring water, the culture medium comprised at least 2 mg/l of the main elements, such as magnesium, nitrate and phosphate, at least 500 mg/l hydrogen carbonate as a carbon source and at least 10 µg/l of the trace elements, such as iron, zinc, manganese and copper. It comprised 1-2 mmol/l $Na^+$. No carbon dioxide was added during culturing. Light energy was provided by sunlight and for gas exchange the surface of the culture was in contact with the atmosphere. Agitation was provided by a paddle wheel.

Five times, a 50 liter monoculture of *Scenedesmus* was used for the inoculation of the open pond. Inoculations were stopped when the water turned green, based on visual inspection. Due to photosynthesis activity of the microalgae, the pH increased automatically to values of 10-11 during the day light period in accordance with the carbon dioxide and hydrogen carbonate reaction equation. After the culture had reached a density of about 300 mg/l, which took about five days, the microalgae harvesting process was turned on continuously. A harvest rate of 5 $m^3$ per hour was applied. The harvested culture was pumped into the top of a harvesting unit and microalgal cells were allowed to settle. The culture medium was recirculated to the pond and the settled biomass was collected in a food grade container as a liquid slurry with a dry matter content of 3% w/w. The slurry of living cells was stored at 15 degrees C. until use.

Example 2 Root and Leaf Formation in *Arabidopsis* Plants

*Arabidopsis thaliana* (Col-0) seeds were sown in soil (Jongkind Zaaigrond NR 1/SIR, Jongkind BV, Aalsmeer, the Netherlands). After 7 days, each plant was transferred to a single pot in 40-pots growing trays (6 cm diameter pot size) filled with soil substrate containing all necessary essential minerals (Jongkind Zaaigrond NR 1/SIR). Plants were watered under a normal watering regime (three times per week). Plants were grown in a greenhouse under a light regime consisting of a light period of 16 hours (day light and artificial light) followed by a dark period of 8 hours at 20 degrees Celsius. 120 µl of the liquid composition according to the invention was applied to the soil substrate of each plant once a week. The control group was not treated with liquid composition according to the invention. Control group and test group each comprised 40 plants.

After 5 weeks the plants were analyzed. The plants treated with the liquid composition according to the invention showed improved root development in comparison to the plants grown in the control group. The roots were more branched and had more root hairs (FIG. 1). The plants treated with the liquid composition according to the invention also showed more and healthier looking leaves in comparison to the plants grown in the control group.

Example 3 Tomato Plants in Solid Substrate

*Solanum lycopersicum* seeds were sown in soil (Jongkind Zaaigrond NR 1/SIR, Jongkind BV, Aalsmeer, the Netherlands). After 10 days, each plant was transferred to a single pot (dimensions: 9×9×10 cm) filled with soil substrate containing sufficient minerals for the early growth phase (Jongkind Zaaigrond NR 1/SIR). Plants were watered under a normal watering regime (three times per week). Plants were grown in a greenhouse under a light regime consisting of a light period of 16 hours (day light and artificial light) followed by a dark period of 8 hours at 20-25 degrees Celsius. 60 µl of liquid composition according to the invention was applied to the soil substrate of each plant once a week until the end of week 4 of the experiment. Plants were transferred to bigger pots (22.6 cm in diameter) filled with Jongkind Zaaigrond NR 1/SIR. From week 5 until week 7 of the experiment 300 µl liquid composition according to the invention was applied and from week 7 onwards 1.5 ml was applied. The control group was not treated with liquid composition according to the invention. Test group and control group each comprised 24 plants grouped in one tray.

After six weeks both groups were compared. Plants treated with liquid composition according to the invention were taller than plants grown in the control group. When bearing fruits, the plants treated with liquid composition according to the invention were also greener and healthier. As a result of a lack of minerals, the plants from the control group became stressed, yellow and unhealthy faster. After 10 weeks, the tomato plants treated with liquid composition according to the invention were bearing more fruits than the plants from the control group. After ripening of the fruits, fruit experts were subjected to a blind test, i.e. they were given fruits for tasting without further information about their treatment. The experts rated the tomatoes from plants fed with liquid composition according to the invention to be of superior quality than those from the control group.

Example 4 Tomato Plants in Hydroculture

Plant growth performance tests were executed with tomatoes in liquid growth medium. For these tests, plastic boxes were used and filled with liquid fertilizers (hydroculture). Juvenile tomato plants (about 15 cm long) which had been grown in so called plugs, were placed in small holes of polystyrene plates. The poly styrene plates were floating at the surface of the liquid in the plastic boxes. The effect of the composition according to the invention in hydroculture was investigated.

Group 1 (control, no microalgae added) was grown in 10 liter of inorganic fertilizer, containing all the essential main and trace elements for plant growth. The pH was adjusted to 5.8 at the beginning of the experiment. EC-value 3.6 mS/cm. Group 2 (with microalgae) was grown in 9000 ml of inorganic fertilizer, containing all the essential main and trace elements for plant growth, plus 1000 ml microalgae concentrate, freshly harvested, dry matter content about 4% w/w. The pH was adjusted to 5.8 at the beginning of the experiment. EC-value 2.6 mS/cm. Each test group comprised 5 tomato plants.

The plants were grown for five weeks in the hydroculture system situated in a glasshouse with normal daylight conditions (day-night light cycle) and without conditions of temperature control. Liquid was replenished once with 10 liters. The liquid fertilizers in the plastic boxes were aerated (mixed) during the test with small air pump and bristle stone. No active fertilization of the tomato plants was undertaken during flowering period.

Figure 2:
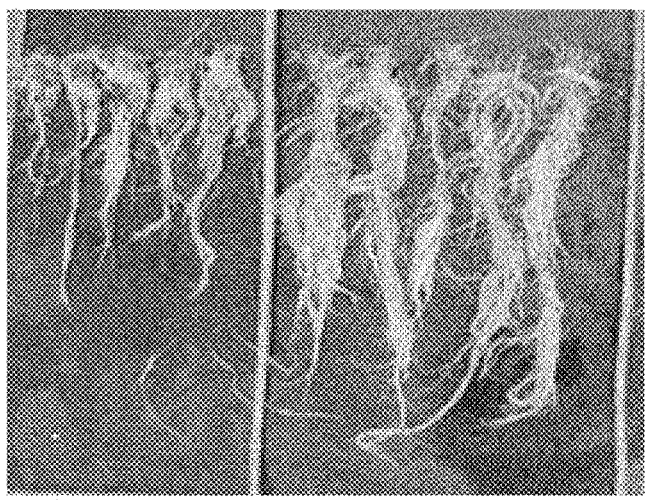
FIG. 2 Root development of tomatoes in hydro culture system. Left: control group grown in growth medium containing all the essential minerals; Right: grown with addition of microalgae to the growth medium.

In comparison with the control group 1, group 2 showed 80% better root development (FIG. 2), based on weight of the roots, and about 43% better growth performance, based on the biomass of the plants. This shows that the liquid composition according to the invention in combination with inorganic fertilizer leads to significant growth performance for roots and biomass in hydroculture.

Example 5 Fruit Formation in Strawberry Plants

The production of strawberries (*Fragaria Elsanta*) was investigated with strawberry plants treated with liquid formulations of microalgae. To this end, juvenile strawberry plants of equal size were used and the plants were placed in large container pots filled with enriched substrate (Jongkind substrate certified for horticulture EN12580, Jongkind BV, Aalsmeer, the Netherlands).

Figure 3:
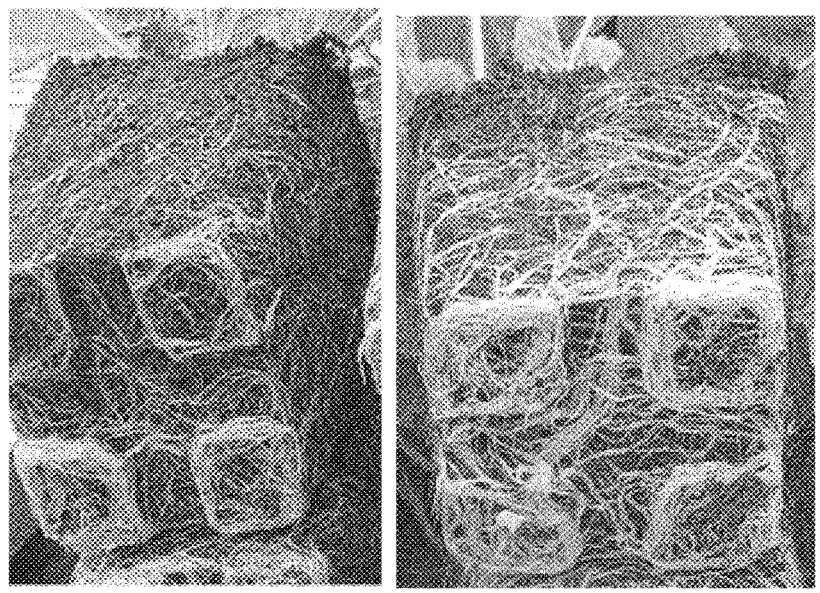
FIG. 3 Root development of strawberries; left: control plant; right: with addition of microalgae.

Group 1 (control, no microalgae added) was grown on substrate enriched with minerals (EN12580) without addition of liquid composition according to the invention. Group 2 was grown on substrate (EN12580) with a liquid formulation of inorganic fertilizer and liquid composition according to the invention in a weight ratio of 1:25. A volume of 20 ml of the fertilizer/microalgae mixture was added to the substrate of each plant, close to the plant, once a week for six weeks. The total amount of ripe strawberries was counted. The results showed that the strawberries which received the liquid composition according to the invention were able to produce 10% more strawberries and 10% more ripe strawberries than the control group. Visual assessment of root development revealed that the strawberry plants of group 2 showed more roots than the plants of the control group (FIG. 3).

Example 6 Flowering of Peonies

Six groups of peonies (Itoh Peonies) were tested. Each group of peonies consisted of 5 plants. The tubers were placed in plastic containers. Substrates of different suppliers were used for the peonies of group 1 (Jongkind substrate certified for horticulture EN12580, Jongkind, Aalsmeer, the Netherlands) and group 2 (Van Egmond Substrates BV, Amsterdam, the Netherlands). The substrates of these groups were completed with slow release solid fertilizer pellets (nitrogen slow release, Koppert BV, Berkel &Rodenrijs, the Netherlands). In this way the substrates contained all the essential elements necessary for optimal growth conditions of the peonies. The other four groups were grown in substrate (Jongkind EN12580) with addition of liquid composition according to the invention instead of fertilizer. Addition of microalgae was started after the tubers were planted in the substrate. During a period of 3 months, once a week a liquid composition according to the invention (10% v/v solution in tap water) was added to the substrates by injection with a syringe. After this period the peonies started flowering. During the first growth cycle of peonies the flower formation is very poor. In general peonies starts flowering in the second year after being placed in substrate. The number of flowers per plant was counted. The results showed only one plant with flowers for group 1 and 2 (10% of the plants). The plants of groups 3, 4, 5 and 6 showed 18 plants with flowers (90% of the plants). This shows that the addition of a liquid composition according to the invention, comprising living microalgae, improves plant flowering.

Example 7 Flower Formation in Orchids

Orchids (Orchids Snowflake) of early growth stage were used to test the effect of microalgae on flower formation and branching. In total 76 plants per group were tested. One control group, to which no microalgae were added, and one test group, with addition of microalgae, were tested during a growth cycle period of 35 weeks. The plants were placed in transparent plastic containers pots and once a week tap water (control group) or a 10% v/v solution of the liquid composition according to the invention in tap water (test group) was sprayed over the plants. At the end of the horticulture growing stage, the flowers and branches of each individual plant were counted.

The results showed 13% more flowers and 34% more branches for the group with addition of living microalgae compared with the control group. This shows that the addition of a liquid composition according to the invention, comprising living microalgae, improves plant flowering and branching.

Example 8 the Effect of Fresh Liquid Microalgae Compared to Dried Microalgae

*Solanum lycopersicum* seeds were sown in soil (Jongkind Zaaigrond NR 1/SIR, Jongkind BV, Aalsmeer, the Netherlands). After 10 days, each plant was transferred to a single pot (dimensions: 9×9×10 cm) filled with soil substrate containing sufficient minerals for the early growth phase (Jongkind Zaaigrond NR 1/SIR). Plants were grown in a greenhouse under a light regime and watering regime as in Example 3. The plants were divided into two groups. One group of plants was treated with fresh living green microalgae prepared according to Example 1. The other group of plants was treated with dried microalgae. To obtain dried microalgal biomass, liquid microalgal biomass prepared according to Example 1 was dried with a drum dryer system. During this process the algal biomass was heated for a few seconds at 90-100 DEG C. In contrast to the liquid microalgal product, the dried algal biomass no longer contained living cells, due to the heating process. The functionality of liquid microalgae (living cells) and dried microalgae (dead cells) was compared for the growth response of *Solanum lycopersum*. During the growth cycle the development of the biomass of the plants was registered by measuring the length of the stem. The growth cycle was followed for up to about 10 weeks. It is known that after 8 weeks, tomato plants start to produce less biomass because of transition from vegetative to generative phase.

Figure 4:
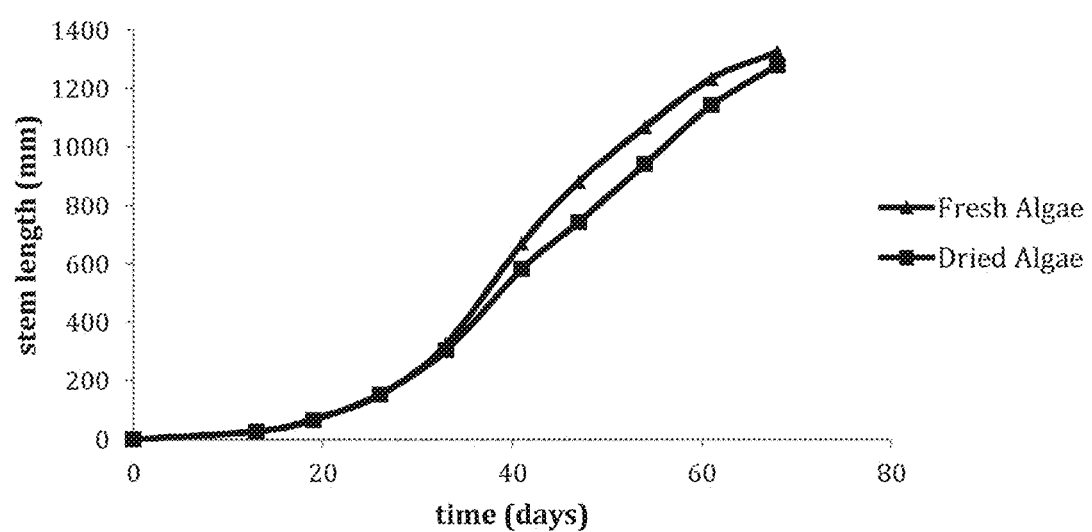
FIG. 4 Growth response (stem length) of *Solanum lycopersum* to treatment with fresh microalgae (living cells, triangles) or dried microalgae (dead cells, squares).

The results are shown in FIG. 4. After about 35 days, the plants with liquid product of microalgae showed a faster increase in stem length and this difference was continued during the growth cycle of the plants. In addition, the plants treated with fresh microalgae started earlier with the generative phase, meaning that these plants started earlier with tomato fruit formation, compared to the dried microalgae. In conclusion, plants treated with fresh liquid composition show accelerated stem growth and earlier fruit formation than plants treated with dried microalgae.

Example 9 the Effect of Fresh Liquid Microalgae Compared to Seaweed

*Solanum lycopersicum* seeds were sown in soil (Jongkind Zaaigrond NR 1/SIR, Jongkind BV, Aalsmeer, the Netherlands). After 10 days, each plant was transferred to a single pot (dimensions: 9×9×10 cm) filled with soil substrate containing sufficient minerals for the early growth phase (Jongkind Zaaigrond NR 1/SIR). Plants were grown in a greenhouse under a light regime and watering regime as in Example 3. The plants were divided into three groups. One group of plants was treated with fresh living green microalgae according to the invention, the other group of plants was treated with a product composed of seaweed (*Ascophyllum nodosum*, Caldic lberica, Barcelona, Spain) and the third group did not get anything extra (control). During the growth cycle, the development of the biomass of the plants was registered by measuring the length of the stems.

The results after five weeks are shown in FIG. 5. After five weeks, the plants treated with seaweed did slightly better than the untreated plants. The plants with the fresh liquid product of microalgae had a much better growth performance (percentage 22%) than the plants treated with seaweed and the untreated plants (control) (Table 1).

TABLE 1

| Tomato plant growth | stem length (cm) | difference with control |
|---|---|---|
| control | 22.2 | — |
| seaweed *A. nodosum* | 22.7 | +2% |
| *Scenedesmus* | 27.6 | +22% |

Example 10 Begonias Treated with Fresh *Pediastrum Boryanum*

In a glass greenhouse, cuttings of mother plants of the species *Begonia netja* were placed in plastic pots (9 cm volume per pot) filled with substrate (Jongkind Zaaigrond NR 1/SIR). Immediately after placement dosing of fertilizer and liquid microalgal product started. During a growth cycle of 14 weeks (from cuttings to mature flowering plants, all plants (n=160) received a liquid fertilizer product which was composed of an excess of all the essential trace elements and main elements, once a week with water. In addition, a selected subgroup (80 plants) of these plants received 2.5 ml fresh liquid microalgal product per plant per week. The fresh liquid microalgal product according of the invention was predominated by *Pediastrum boryanum* and obtained by culturing the green microalga *Pediastrum boryanum* as described in Example 1. After 10 weeks a significant difference in plant size was noticed. The plants in the subgroup, which had received microalgae, showed better plant development and flower formation than the rest of the plants, which was quantified by weighing the majority of the plants. To avoid the effect of difference caused by the substrate (difference in volume and moisture content per plant, the roots together with the substrate were removed from the plants. An average difference of 23% was observed between the weight (leaves and flowers) of the control group and the weight of the group with the addition of liquid microalgae. The results are shown in Table 2.

TABLE 2

| Begonia Netja | average weight/plant (gram), n = 50 | difference with control |
|---|---|---|
| *Pediastrum boryanum* | 80.6 | +23% |
| control | 65.6 | — |

The invention claimed is:

1. A method for preparing a liquid composition comprising living green microalgae to improve plant growth, wherein the method comprises:
    culturing green microalgae in an open pond in an aqueous medium at pH 10 to pH 12, the medium comprising less than 5 mM sodium, and supplying hydrogen carbonate as the inorganic carbon source;
    harvesting the green microalgae by sedimentation or centrifugation to obtain a liquid composition comprising living green microalgae, the liquid composition having a dry matter content in the range of 0.5% w/w to 10% w/w and a sodium content of less than 5 mM.
2. A method according to claim 1, wherein the aqueous medium comprises spring water.
3. A method according to claim 1, wherein the living green microalgae are harvested by autoflocculation without the addition of flocculating agents to the culture.
4. A method according to claim 1, wherein the dry matter content of the liquid composition is in the range of 1% w/w to 5% w/w.
5. A method according to claim 1, wherein the liquid composition comprises maximally 2 mM sodium.
6. A method according to claim 1, wherein the liquid composition is stored at a temperature in the range of 4 to 25 degrees C. for up to one year.
7. A method according to claim 1, wherein the living green microalgae are selected from the group consisting of *Ankistrodesmus, Dunaliella, Haematococcus, Pediastrum, Scenedesmus* and *Volvox*.
8. A method for promoting plant growth, comprising applying the liquid composition obtained by the method of claim 1 to a plant to promote growth of the plant.
9. A liquid composition comprising living green microalgae, maximally 5 mM sodium and a dry matter content in the range of 0.5% w/w to 10% w/w.
10. A liquid composition according to claim 9, wherein the living green microalgae are selected from the group consisting of *Ankistrodesmus, Haematococcus, Pediastrum, Scenedesmus* and *Volvox*.
11. A fertilizer or substrate comprising a liquid composition according to claim 9, wherein the fertilizer is a liquid fertilizer and the substrate includes clay, coir dust, compost, fibers, grit, loam, moss, peat, perlite, sand or water.
12. A method for improving growth, nutrient assimilation, efficiency of metabolism or photosynthesis of a plant, seed, tuber or bulb, comprising applying the liquid composition of claim 9 to a plant, seed, tuber or bulb to improve growth, nutrient assimilation, efficiency of metabolism or photosynthesis.
13. The method according to claim 12, wherein the liquid composition is mixed with or in a substrate or fertilizer.
14. The method according to claim 12, wherein the liquid composition is sprayed or injected onto or into a plant, seed, tuber, bulb or substrate.

15. The method according to claim 12, wherein the liquid composition is applied continuously, every day, once a week, three times a week or every month.

16. The method according to claim 12, wherein the plant is a consumable plant or an ornamental plant.

17. The method according to claim 12, wherein the plant is a member of the *Asteraceae, Begoniaceae, Brassicaceae, Chenopodiaceae, Cucurbitaceae, Gramineae, Leguminosae, Liliaceae, Malvaceae, Musaceae, Orchidaceae, Paeoniaceae, Rosaceae, Rubiaceae, Rutaceae, Salicaceae, Solanaceae, Sterculiaceae or Vandeae* family.

\* \* \* \* \*